(12) United States Patent
Tilford

(10) Patent No.: US 8,082,572 B1
(45) Date of Patent: Dec. 20, 2011

(54) METHOD AND APPARATUS FOR TRANSMITTING, RECEIVING, AND UTILIZING AUDIO/VISUAL SIGNALS AND OTHER INFORMATION

(75) Inventor: Arthur R. Tilford, Yorba Linda, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1310 days.

(21) Appl. No.: 09/590,417

(22) Filed: Jun. 8, 2000

(51) Int. Cl.
*H04N 7/173* (2006.01)
*H04N 7/16* (2006.01)

(52) U.S. Cl. ......... 725/133; 725/141; 725/142; 725/143
(58) Field of Classification Search .................. 725/133, 725/141–143
See application file for complete search history.

(56) References Cited

U.S. PATENT DOCUMENTS

| | | |
|---|---|---|
| 4,613,901 A | 9/1986 | Gilhousen et al. |
| 4,633,309 A | 12/1986 | Li et al. |
| 4,675,732 A | 6/1987 | Oleson |
| 4,694,490 A | 9/1987 | Harvey et al. |
| 4,866,769 A | 9/1989 | Karp |
| 4,866,787 A | 9/1989 | Olesen |
| 5,033,084 A | 7/1991 | Beecher |
| 5,132,992 A | 7/1992 | Yurt et al. |
| 5,168,353 A | 12/1992 | Walker et al. |
| 5,172,413 A | 12/1992 | Bradley et al. |
| 5,199,066 A | 3/1993 | Logan |
| 5,301,245 A | 4/1994 | Endoh |
| 5,301,352 A | 4/1994 | Nakagawa et al. |
| 5,357,276 A | 10/1994 | Banker et al. |
| 5,371,551 A | 12/1994 | Logan et al. |
| 5,386,587 A | 1/1995 | Yuzawa |
| 5,396,293 A | 3/1995 | Shellard |
| 5,421,031 A | 5/1995 | De Bey |
| 5,438,423 A | 8/1995 | Lynch et al. |
| 5,440,336 A | 8/1995 | Buhro et al. |
| 5,495,531 A | 2/1996 | Smiedt |
| 5,506,902 A | 4/1996 | Kubota |

(Continued)

FOREIGN PATENT DOCUMENTS

EP 710017 A2 * 5/1996

(Continued)

OTHER PUBLICATIONS

"PocketTV Brings Video to Palm-size PC", [online] [retrieved on Apr. 16, 2003] Retrived from the Internet Archive (WayBack Machine) using Internet <URL: http://web.archive.org/web/20000816034339/ww.palmsizepc.com/mar2000-14-1.html>.*

(Continued)

*Primary Examiner* — Pankaj Kumar
*Assistant Examiner* — Franklin Andramuno

(57) ABSTRACT

Information such as audio/visual signals, books, video games, etc. are broadcast via satellite and received in a set top box. When requested by a hand held computing device (HHCD), the information is transmitted by the set top box to the HHCD and stored in the HHCD. The HHCD may be configured to display the information on the HHCD's display screen, play back the audio, read a book on the display screen, play a video game on the hand held device, etc. The HHCD may also be configured to transmit the information to a set top box that is connected to an output device (e.g., a television, stereo, etc.). The information is played back or utilized by the output device.

34 Claims, 4 Drawing Sheets

U.S. PATENT DOCUMENTS

| | | | |
|---|---|---|---|
| 5,557,541 A * | 9/1996 | Schulhof et al. | 725/133 |
| 5,565,805 A | 10/1996 | Nakagawa et al. | |
| 5,583,937 A | 12/1996 | Ullrich et al. | |
| 5,586,264 A | 12/1996 | Belknap et al. | |
| 5,592,551 A | 1/1997 | Lett et al. | |
| 5,592,651 A | 1/1997 | Rackman | |
| 5,594,491 A | 1/1997 | Hodge et al. | |
| 5,619,247 A | 4/1997 | Russo | |
| 5,640,453 A | 6/1997 | Schuchman et al. | |
| 5,642,418 A | 6/1997 | Farris et al. | |
| 5,663,896 A | 9/1997 | Aucsmith | |
| 5,675,390 A * | 10/1997 | Schindler et al. | 345/717 |
| 5,677,895 A | 10/1997 | Mankovitz | |
| 5,701,383 A | 12/1997 | Russo et al. | |
| 5,701,582 A | 12/1997 | De Bey | |
| 5,710,970 A | 1/1998 | Walters et al. | |
| 5,715,315 A | 2/1998 | Handelman | |
| 5,715,403 A | 2/1998 | Stefik | |
| 5,721,829 A | 2/1998 | Dunn et al. | |
| 5,724,646 A | 3/1998 | Ganek et al. | |
| 5,729,280 A | 3/1998 | Inoue et al. | |
| 5,734,853 A | 3/1998 | Hendricks et al. | |
| 5,748,732 A | 5/1998 | LeBerre et al. | |
| 5,761,302 A | 6/1998 | Park | |
| 5,764,762 A | 6/1998 | Kazmierczak et al. | |
| 5,784,095 A | 7/1998 | Robbins et al. | |
| 5,790,663 A | 8/1998 | Lee et al. | |
| 5,793,971 A | 8/1998 | Fujita et al. | |
| 5,805,699 A | 9/1998 | Akiyama et al. | |
| 5,826,165 A | 10/1998 | Echeita et al. | |
| 5,831,664 A * | 11/1998 | Wharton et al. | 725/131 |
| 5,845,240 A | 12/1998 | Fielder | |
| 5,850,218 A | 12/1998 | LaJoie et al. | |
| 5,864,747 A | 1/1999 | Clark et al. | |
| 5,867,207 A | 2/1999 | Chaney et al. | |
| 5,899,582 A | 5/1999 | DuLac | |
| 5,912,969 A | 6/1999 | Sasamoto et al. | |
| 5,914,941 A * | 6/1999 | Janky | 370/313 |
| 5,926,205 A | 7/1999 | Krause et al. | |
| 5,930,215 A | 7/1999 | Fite et al. | |
| 5,933,500 A | 8/1999 | Blatter et al. | |
| 5,936,660 A | 8/1999 | Gurantz | |
| 5,937,067 A | 8/1999 | Thatcher et al. | |
| 5,953,418 A | 9/1999 | Bock et al. | |
| 5,966,186 A | 10/1999 | Shigihara et al. | |
| 5,973,756 A | 10/1999 | Erlin | |
| 5,978,649 A | 11/1999 | Kahn | |
| 5,999,628 A | 12/1999 | Chan | |
| 5,999,629 A | 12/1999 | Heer et al. | |
| 6,005,937 A | 12/1999 | Lee | |
| 6,011,511 A | 1/2000 | Chuong et al. | |
| 6,025,868 A | 2/2000 | Russo | |
| 6,055,314 A | 4/2000 | Spies et al. | |
| 6,055,566 A * | 4/2000 | Kikinis | 709/219 |
| 6,061,451 A | 5/2000 | Muratani et al. | |
| 6,061,452 A | 5/2000 | Suzuki | |
| 6,069,647 A | 5/2000 | Sullivan et al. | |
| 6,072,873 A | 6/2000 | Bewick | |
| 6,072,982 A | 6/2000 | Haddad | |
| 6,075,330 A | 6/2000 | Terk | |
| 6,091,883 A | 7/2000 | Artigalas et al. | |
| 6,097,441 A * | 8/2000 | Allport | 348/552 |
| 6,105,134 A | 8/2000 | Pinder et al. | |
| 6,144,400 A | 11/2000 | Ebisawa | |
| 6,148,081 A | 11/2000 | Szymanski et al. | |
| 6,157,719 A | 12/2000 | Wasilewski et al. | |
| 6,157,949 A | 12/2000 | Cheng et al. | |
| 6,169,879 B1 * | 1/2001 | Perlman | 725/119 |
| 6,202,211 B1 | 3/2001 | Williams, Jr. | |
| 6,229,895 B1 | 5/2001 | Son et al. | |
| 6,240,401 B1 | 5/2001 | Oren et al. | |
| 6,263,504 B1 | 7/2001 | Ebisawa | |
| 6,266,480 B1 | 7/2001 | Ezaki et al. | |
| 6,266,481 B1 | 7/2001 | Lee et al. | |
| 6,286,142 B1 | 9/2001 | Ehreth | |
| 6,288,716 B1 | 9/2001 | Humpleman et al. | |
| 6,289,455 B1 | 9/2001 | Kocher et al. | |
| 6,317,883 B2 | 11/2001 | Marics | |
| 6,317,884 B1 | 11/2001 | Eames et al. | |
| 6,370,318 B1 | 4/2002 | Iwaki | |
| 6,370,688 B1 | 4/2002 | Hejna, Jr. | |
| 6,381,747 B1 | 4/2002 | Wonfor et al. | |
| 6,398,245 B1 | 6/2002 | Gruse et al. | |
| 6,415,031 B1 | 7/2002 | Colligan et al. | |
| 6,437,836 B1 * | 8/2002 | Huang et al. | 725/133 |
| 6,456,985 B1 | 9/2002 | Ohtsuka | |
| 6,466,671 B1 | 10/2002 | Maillard et al. | |
| 6,466,921 B1 | 10/2002 | Cordery et al. | |
| 6,473,858 B1 | 10/2002 | Shimomura et al. | |
| 6,476,825 B1 * | 11/2002 | Croy et al. | 345/716 |
| 6,480,667 B1 | 11/2002 | O'Connor | |
| 6,487,663 B1 | 11/2002 | Jaisimha et al. | |
| 6,487,722 B1 | 11/2002 | Okura et al. | |
| 6,496,980 B1 | 12/2002 | Tillman et al. | |
| 6,502,139 B1 | 12/2002 | Birk et al. | |
| 6,510,519 B2 | 1/2003 | Wasilewski et al. | |
| 6,516,465 B1 | 2/2003 | Paskins | |
| 6,519,693 B1 | 2/2003 | De Bey | |
| 6,519,772 B1 | 2/2003 | Wiggins | |
| 6,530,085 B1 * | 3/2003 | Perlman | 725/82 |
| 6,542,870 B1 | 4/2003 | Matsumoto | |
| 6,550,011 B1 | 4/2003 | Sims, III | |
| 6,560,340 B1 | 5/2003 | Akins et al. | |
| 6,574,609 B1 | 6/2003 | Downs et al. | |
| 6,611,812 B2 | 8/2003 | Hurtado et al. | |
| 6,654,547 B1 | 11/2003 | Maeda et al. | |
| 6,655,580 B1 | 12/2003 | Ergo et al. | |
| 6,681,326 B2 | 1/2004 | Son et al. | |
| 6,697,489 B1 | 2/2004 | Candelore | |
| 6,748,080 B2 | 6/2004 | Russ et al. | |
| 6,754,904 B1 * | 6/2004 | Cooper et al. | 725/32 |
| 6,804,357 B1 | 10/2004 | Ikonen et al. | |
| 6,853,728 B1 | 2/2005 | Kahn et al. | |
| 6,889,208 B1 | 5/2005 | Okabe et al. | |
| 6,904,522 B1 | 6/2005 | Benardeau et al. | |
| 6,934,963 B1 | 8/2005 | Reynolds et al. | |
| 6,961,858 B2 | 11/2005 | Fransdonk | |
| 6,993,499 B2 | 1/2006 | Gagnon et al. | |
| 7,035,827 B2 | 4/2006 | Ezaki | |
| 7,191,335 B1 | 3/2007 | Maillard | |
| 7,231,450 B1 | 6/2007 | Clifford et al. | |
| 7,461,249 B1 | 12/2008 | Pearson et al. | |
| 7,539,307 B2 | 5/2009 | Lotspiech et al. | |
| 2001/0001876 A1 | 5/2001 | Morgan et al. | |
| 2001/0046299 A1 | 11/2001 | Wasilewski et al. | |
| 2002/0001386 A1 | 1/2002 | Akiyama | |
| 2002/0023219 A1 | 2/2002 | Treffers et al. | |
| 2002/0048367 A1 | 4/2002 | Maillard | |
| 2002/0056112 A1 * | 5/2002 | Dureau et al. | 725/78 |
| 2002/0112243 A1 | 8/2002 | Hunter et al. | |
| 2002/0170054 A1 | 11/2002 | Kudelski et al. | |
| 2003/0040962 A1 * | 2/2003 | Lewis | 705/14 |
| 2003/0061477 A1 | 3/2003 | Kahn et al. | |
| 2003/0105718 A1 | 6/2003 | Hurtado et al. | |
| 2003/0110132 A1 | 6/2003 | Sako | |
| 2003/0145183 A1 | 7/2003 | Muehring | |
| 2003/0174844 A1 | 9/2003 | Candelore | |
| 2003/0190149 A1 | 10/2003 | Chang et al. | |
| 2003/0228911 A1 | 12/2003 | Dernis et al. | |
| 2005/0050333 A1 | 3/2005 | Yeap et al. | |
| 2005/0235361 A1 | 10/2005 | Alkove et al. | |
| 2006/0039560 A1 | 2/2006 | Wasilewski | |
| 2006/0168663 A1 | 7/2006 | Viljoen et al. | |
| 2006/0179489 A1 | 8/2006 | Mas Ribes | |
| 2007/0198414 A1 | 8/2007 | Derrenberger | |

FOREIGN PATENT DOCUMENTS

| | | |
|---|---|---|
| EP | 0 936 812 A1 | 8/1999 |
| EP | 0 975 165 A2 | 1/2000 |
| EP | 0 989 557 A1 | 3/2000 |
| EP | 1156676 A2 | 11/2001 |
| EP | 1304871 A2 | 4/2003 |
| EP | 1369152 A2 | 12/2003 |
| JP | 06351023 A | 6/1993 |
| JP | 11136708 A | 5/1999 |
| WO | WO 92/11713 | 7/1992 |
| WO | WO 99/18729 | 4/1999 |

| | | |
|---|---|---|
| WO | WO 00/13412 | 3/2000 |
| WO | WO 0019294 A2 * | 4/2000 |
| WO | WO 01/43444 A2 | 6/2001 |
| WO | WO 02/15184 | 2/2002 |
| WO | WO 02/065750 A2 | 8/2002 |
| WO | 2004/014075 A2 | 2/2004 |

OTHER PUBLICATIONS

"HP Jornada 430/430se Plam-size PC: User's Guide", Hewlett Packard, 1999, pp. 7-9.*

"PocketTV—MPEG moview player for Pocket PC and WinCE" [online], May 17, 2000 MPEG TV, LLC [retrieved on Mar. 26, 2004]. Retrieved from the Internet <URL: http://web.archive.org/web/200006210123803/www.mpegtv.com/wince/pockettv/index.html>.*

"Download PocketTV (beta) for WinCE" [online], Nov. 3, 1999 MPEG TV, LLC [retrieved on Mar. 26, 2004]. Retrieved from the Internet <URL: http://web.archive.org/web/19991127093158/www.mpegtv.com/wince/pockettv/index.html>.*

"HP Jornada 430/430se Palm-size PC: User's Guide—Chapter 6", Hewlett Packard, 1999, pp. 43-54.*

P. Venkat Rangan et al., *Designing An On-Demand Multimedia Service*, IEEE Communications Magazine, Jul. 1992, vol. 30, No. 7, title page and pp. 56-64.

Wanjiun Liao et al., *The Split and Merge Protocol for Interactive Video-On-Demand*, IEEE MultiMedia, Oct.-Dec. 1997, vol. 4, No. 4, index and pp. 51-62.

Robert Johnston et al., *A Digital Television Sequence Store*, IEEE Transactions on Communications, May 1978, vol. COM-26, No. 5, index and pp. 594-600.

*Proposed SMPTE Standard for Television—Splice Points for MPEG-2 Transport Streams*, SMPTE Journal, Oct. 1998, SMPTE 312M, pp. 916-925.

Michael Robin et al., *Digital Television Fundamentals—Design and Installation of Video and Audio Systems*, McGraw-Hill, Chapter 8, title page(s) and pp. 345-425.

Yongchen Li, et al., *Security Enchanced MPEG Player*, IEEE, 1996, pp. 169-175.

Fink, *Ready to take the dive? It's fast-forward as new DVD and DIVX formats hit market* (includes graphic: Home video: the next generation plus: Some selections that show off the system), York Daily Record, Dec. 21, 1998, pp. 1-3.

Sin-Joo Lee, et al., *A Survey of Watermarking Techniques Applied to Multimedia*, IEEE, 2001, pp. 272-277.

1$^{st}$ Report of EBU / SMPTE Task Force for Harmonized Standards for the Exchange of Television Program Material as Bit Streams, May 6, 1997, Version 1.30, pp. 1-73.

B. Schneier, *Applied Cryptography—Protocols, Algorithms, and Source Code in C*, 2$^{nd}$ Edition, pp. 216-222, 357-362.

Anerousis, N., "Skycast: The Satellite Digital Broadcast Relay Service", AT&T Labs Research, unpublished manuscript, 1999, pp. 1-4.

Tsubakiyama, Hideki and Koga, Keiichiro; "Security for Information Data Broadcasting System with Conditional-Access Control"; IEEE; 1993; pp. 164-170.

EBU Project Group B/CA; "Functional Model of a Conditional Access System"; EBU Technical Review; Jun. 10, 1995; pp. 64-77.

Ma, Huadong; Shin, Kang G.; "Multicast Video on Demand Services"; ACM SIGCOMM Computer Communication Review; vol. 32, Issue 1; Jan. 2002; pp. 31-43; ACM Press; New York, New York.

Tantaoui, Mounir A., Hua, Kien A., Sheu, Simon; "Interaction with Broadcast Video"; International Multimedia Conference Proceedings of the 10$^{th}$ ACM International Conference on Multimedia; pp. 29-38; ACM Press; New York, New York; 2002; ISBN: 1-58113-620-X.

Griwodz, Carsten; Merkel, Oliver; Dittmann, Jana; Steinmetz, Ralf; "Protecting Vo D The Easier Way"; International Multimedia Conference Proceedings of the 6$^{th}$ ACM International Conference on Multimedia; pp. 21-28; ACM Press; New York, New York; 2002; ISBN: 0-201-30990-4.

"PKCS #1v2.1: RSA Cryptography Standard"; Jun. 14, 2002; RSA Laboratories; 61 pages.

* cited by examiner

METHOD AND APPARATUS FOR TRANSMITTING, RECEIVING, AND UTILIZING AUDIO/VISUAL SIGNALS AND OTHER INFORMATION

CROSS-REFERENCE TO RELATED APPLICATIONS

This application is related to the following co-pending and commonly assigned patent application(s), all of which applications are incorporated by reference herein:

Application Ser. No. 09/428,666, entitled "REMOTE CONTROL SIGNAL LEVEL METER," filed on Oct. 28, 1999, by Jon M. Easton et al.; and Application Ser. No. 09/491,959, entitled "VIRTUAL VIDEO ON DEMAND USING MULTIPLE ENCRYPTED VIDEO SEGMENTS," filed on Jan. 26, 2000, by Robert G. Arsenault et al.

BACKGROUND OF THE INVENTION

1. Field of the Invention

The present invention relates to systems and methods for viewing audio/visual information, and in particular to a system and method for capturing and viewing audio/visual information using a handheld/palm computing device.

2. Description of the Related Art

Commonly, program material, including multimedia data (e.g., audio/visual signals (e.g., a television program) and information) are transmitted to homes and businesses for viewing. The signals may be transmitted by satellite and received in a satellite antenna and receiver. Alternatively, the signal may be transmitted via cable to the home or business. Once received, the signal is decoded or translated by a set top box for further processing or viewing/listening on a television or other device. A common problem today is the illegal or unauthorized copying of information such as audio files that have been downloaded to a computer. To prevent such unauthorized copying, set top boxes often utilize technology that decrypts or decodes information that has been transmitted using encryption or encoding technology.

To record program material or save some of the program material for later retrieval and use, many devices are utilized. Video cassette recorders (VCRs) are typically used to record audio/visual signals broadcast for viewing on a television. The signal is received by a VCR and recorded on a tape that may be placed in a compatible format VCR for viewing elsewhere. Alternatively, the information may be recorded digitally on a chip inside of a set top box or intermediate device (e.g., in TiVo, ReplayTV, or a hard drive). In order to record and view transmitted information in a location other than where the receiver is located, a user must (1) record the information on a bulky video tape, and (2) place the video tape into a compatible format VCR that is connected to a viewing device such as a television.

To record and playback digital audio files, the audio files may be compressed, downloaded, and transferred to a portable audio player. The portable player may be used to listen to or edit the audio file. Such audio files may constitute copyright infringement.

What is needed is a small device that is commonly used and carried by a user. In other words, a handheld device that has multiple functions in addition to recording/viewing of audio/visual signals and other information broadcast via satellite or cable is desirable. Additionally, what is needed is a small device that can capture and store information with an added level of security that prevents illegal or improper copying of the information.

Prior art handheld computing devices (also referred to as palm PCs or personal digital assistants (PDA)), the software for such devices, and portable recorders/players do not provide the above described functionality. These problems may be better understood by describing prior art handheld computing devices and recording devices.

Handheld Computing Devices

Many handheld computing devices are available in today's marketplace. Typically, handheld computing devices are only slightly larger than the size of one's palm (hence, the name palm PC) and have a small display screen for viewing a plethora of items. Software can be installed on a PDA to provide enhanced functionality. For example, a personal productivity tool may be installed to provide access to a calendar, contacts, email, Internet browsing, audio books, and audio recording capabilities. Card slots may also be available to provide additional memory or other functions (e.g., a modem). Additionally, some PDAs have infrared (IR) ports for communication.

The PDA available from COMPAQ called AERO allows the PDA to play audio files downloaded onto a desktop computer from the Internet and transferred to the PDA upon synchronization. Further, an instant record button allows voice recording when the button is depressed. Listening to content may be accomplished through an integrated speaker on the back of the unit, or through headphones placed into a jack for private listening. The display screen of the AERO is a 256 color, highly reflective, thin film transistor (TFT), liquid crystal display.

In addition to traditional PDAs, portable electronic books (an electronic version of a book) are also available. An electronic book (also referred to as an ebook) may be an independent handheld computing device or may comprise software installed on a traditional PDA. Ebook software (installed on a PDA or on its own handheld computing device) enables a reader to read, save, highlight, bookmark, and annotate text. Books (i.e., book text and/or a table of contents and other information) are downloaded from a web site and installed on an ebook. Thus, the same ebook device can be used repeatedly for reading different books.

Recording Devices

Recording and playback devices are often utilized to listen to music, audio books, or other audio signals. For example, a tape recorder may be used to record music off of the radio or dictation using a built in microphone. Similarly, compact disc (CD) players and mini-disc players may be utilized for the same purpose.

In the past few years, an audio compression technology referred to as MP3 (Moving Pictures Expert Group (MPEG) Audio Layer 3) has been developed and more widely used. MP3 technology provides for the compression of CD-quality sound by a factor of 12, while providing almost the same high fidelity. Thus, high compression ratios are obtainable that provide reasonable sound quality. MP3 music files may be played via software or a handheld device.

MP3 technology has made it feasible to download quality audio from the web very quickly thus providing a worldwide auditioning system for new musicians and labels. For example, an entire audio CD (more than an hour of music) can be downloaded in five minutes or less. There are a number of MP3 "rippers" and encoders on the market that pull out raw audio data from a music CD and encode it into the MP3 format. Accordingly, there has been considerable bootlegging and copyright infringement when copyrighted material is digitally stored and provided to anyone requesting or downloading the file on the interne.

MP3 portable players, which can be extremely small, have become widely used in today's market. Several models and variations of MP3 portable players are available. The RIO player available from Diamond Multimedia is one such portable player. Some MP3 players can store up to two hours of digital-quality music and up to 32 hours of spoken audio programs. Further, models may have various additional features such as 64 MB of onboard memory (expandable to 96 MB with removable flash cards), universal serial bus (USB) support, no moving parts, software for encoding, managing, and playing digital audio files. Additionally, some portable players have backlit liquid crystal displays (LCD) that show the song/book title, artist, time, and additional information (e.g., tracks, volume, and frequency equalization controls).

The above described recording devices and hand held computing devices download information from a personal computer but do not provide the ability to easily store audio/visual information from a set top box with the set top boxes added antipiracy and security capabilities such as encryption and encoding technology. Further, such devices are often complex and difficult to use.

SUMMARY OF THE INVENTION

To address the requirements described above, the present invention discloses a method, apparatus, article of manufacture, and system for transmitting, receiving, and utilizing audio/visual signals and other information. In accordance with one or more embodiments of the invention, information such as audio/visual signals, books, video games, etc. are broadcast via satellite and received in a set top box. Further, the audio visual information may be encrypted/encoded such that the set top box incorporates the complex technology for decrypting/decoding the signals. When requested by a hand held computing device, the information is transmitted (either encrypted or non-encrypted) by the set top box to the hand held computing device via infrared radiation and stored in the hand held computing device.

In accordance with one or more embodiments of the invention, the hand held computing device is configured to display the audio/visual information on the hand held device's display screen, play back the audio through speakers of the device (or through headphones/earphones attached to the device), read a book on the display screen, play a video game on the hand held device, etc.

In accordance with an alternate embodiment, the hand held device is configured to transmit the information to a set top box that is connected to an output device (e.g., a television, stereo, etc.) using infrared radiation. The information is then played back or utilized by the output device. For example, a user may depress a single button on the hand held device causing a television program that is stored on the device to be transmitted to a set top box and immediately played back on a television connected to the set top box. In another embodiment, the user utilizes the hand held device to interact with a graphical user interface on a display device (e.g., a television) that the user is familiar with. Further, in accordance with one or more embodiments, the set top box has a memory unit that enables the set top box to store information transmitted from either a satellite or a hand held device for later playback, use, or retransmission. Further, the memory may act as a buffer to store information that is transmitted at a faster rate than the information can be passed onto an output device.

The method, apparatus, system, and article of manufacture for the invention comprise various manners for broadcasting, transmitting, storing, and utilizing the information through a hand held computing device. For example, the article of manufacture may comprise a data storage device tangibly embodying instructions to perform the logic of the invention as described above.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
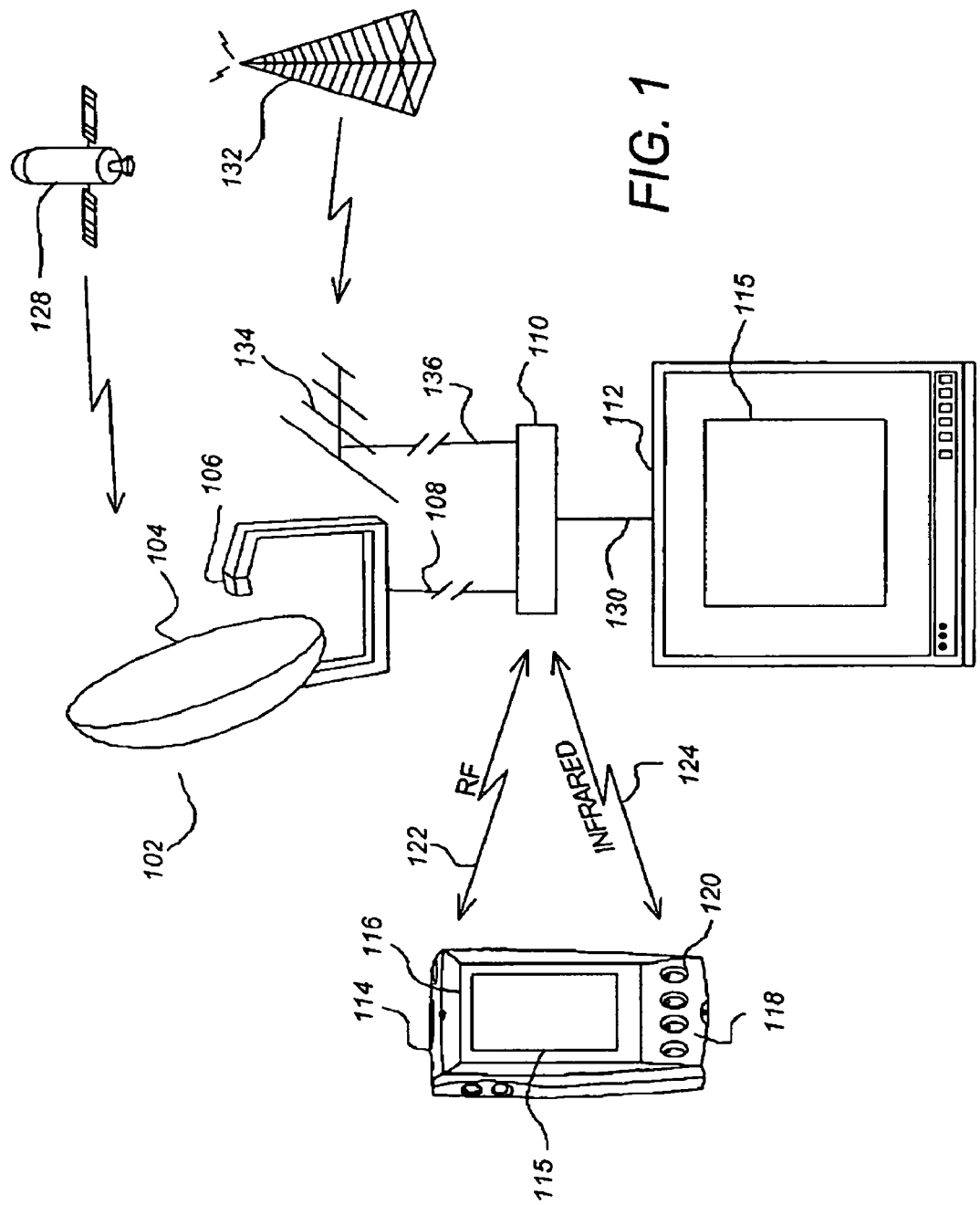
FIG. 1 is a diagram presenting a system view of key elements in accordance with one or more embodiments of the invention.

FIG. 1 is a diagram presenting a system view of key elements in accordance with one or more embodiments of the invention. A satellite 128 broadcasts a transmission having a digital or analog program information signal to a satellite antenna 102. The satellite antenna 102 comprises a reflector 104, which collects the energy transmitted from the satellite 128 (typically, in the C, Ku, or Ka band), and focuses the energy on an LNB 106. The LNB 106 generates a signal from the received energy, which is provided to the set top box 110 via a shielded coaxial cable 108 or similar device.

In the alternative or in combination with the foregoing, the set top box 110 may also receive a terrestrial broadcast from a Multichannel Multipoint Distribution Service (MMDS), Local Multipoint Distribution Service (LMDS), or very high frequency (VHF) or ultrahigh frequency (UHF) broadcast transmitter 132 via a terrestrial signal antenna 134. The program information signal is provided to the set top box 110 via an appropriate interconnection such as a coax cable 136.

The set top box 110 receives, decodes, and demodulates the signal from the low noise block converter (LNB) 106 and/or the terrestrial antenna 134, and provides a video signal 130 to an appropriate output/processing device such as a television (TV) 112, computer with a communicatively coupled display, or similar audio/visual presentation device. In one embodiment, the set top box 110 is an integrated receiver/decoder (IRD). Thus, set top box 110 maintains the ability to decode/decrypt information transmitted by satellite 128. Such encryption/decryption capability is more fully described in copending patent application Ser. No. 09/491,959 filed on Jan. 26, 2000, entitled "Virtual Video on Demand using Multiple Encrypted Video Segments" which is hereby fully incorporated by reference.

In accordance with one or more embodiments of the invention, the set top box 110 is controllable by a handheld computing device or PDA 114. As described herein, a handheld computing device, is any small device that maintains the ability to performed the functionality described with respect to the present invention. Such devices include but are not limited to devices that are configured to receive, transport, or store information or perform computations, calculations, etc. Alternatively, or in addition to controlling set top box 110, PDA 114 may provide for the storage and playback of information transmitted from set top box 110. When requested by a hand held computing device 114, the information is transmitted (either encrypted or non-encrypted) by the set top box 110 to the hand held computing device 114 via infrared radiation and stored in the hand held computing device 114.

In accordance with one or more embodiments, PDA 114 comprises a user input interface 118 typically comprising a plurality of buttons 120 or other user input devices (e.g. touch pad, joystick, mouse, etc.) for accepting user commands. PDA 114 also comprises a display screen 116 that displays information to the user. For example, in accordance with one or more embodiments of the invention, screen 116 is a 256 color, highly reflective, TFT, liquid crystal display. The screen 116 may also be utilized in combination with a stylus or light pen that enables the user to select menu options and enter information by touching the stylus or light pen to screen 116.

User commands may be used to generate coded signals, which are transmitted to the set top box 110 via communications link 124. Typically, these coded signals are transmitted at infrared (IR) wavelengths, but other wavelengths or frequency bands, such as radio frequency (RF) wavelengths may be used as well.

Figure 2:
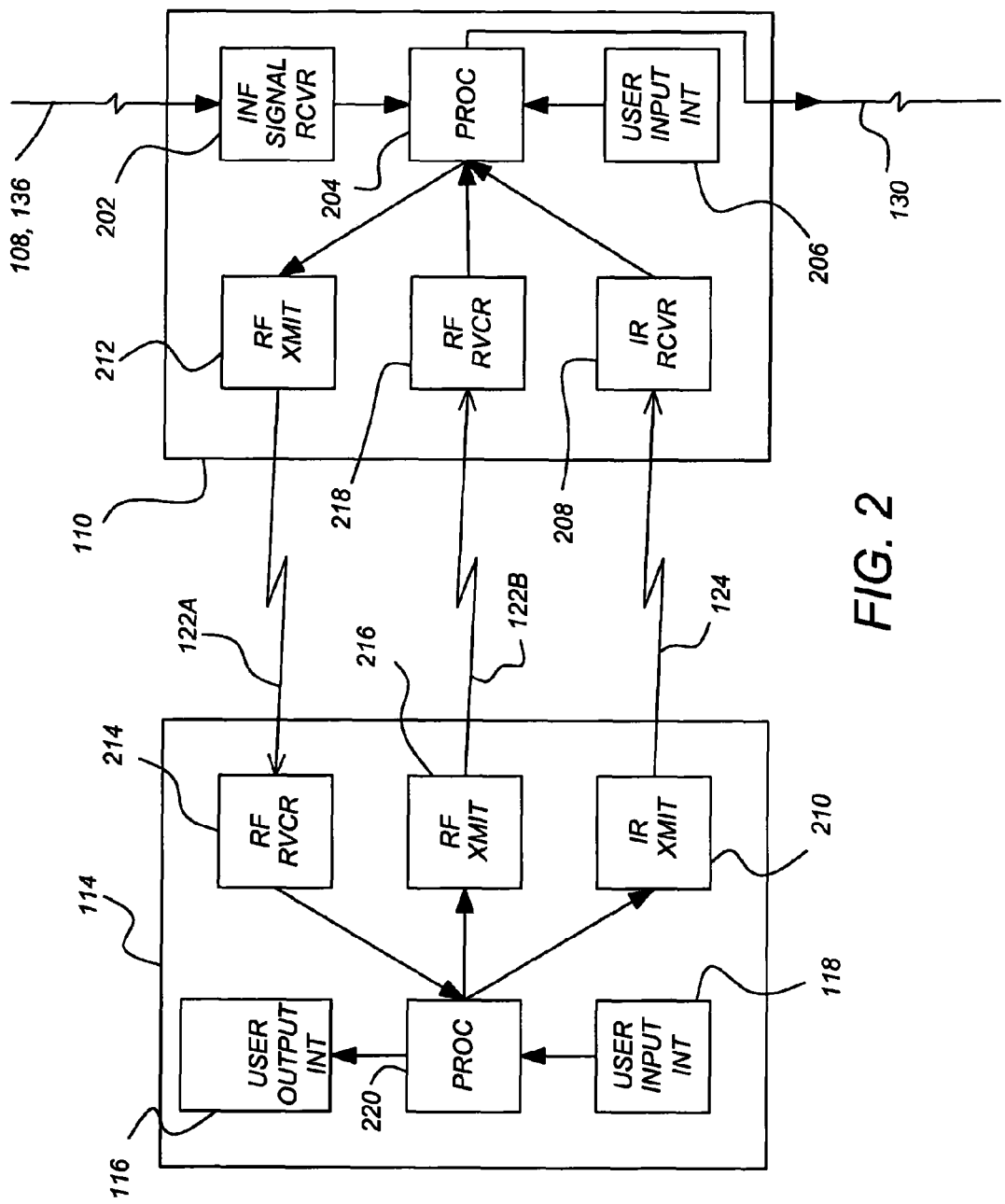
FIG. 2 is a diagram presenting a block diagram of the remote control and the set top box in accordance with one or more embodiments of the invention.

FIG. 2 is a block diagram of the set top box 110 and the PDA 114. The set top box 110 comprises a program information signal receiver 202, which receives the program information signal from the satellite antenna 102 or the conventional antenna 134. In cooperation with a communicatively coupled set top box processor 204, the set top box receiver 202 demodulates and decodes the received program information signal, and transforms that signal into a video (or audio) signal 130 that is in suitable form for reproduction by the output/processing device 112 or other presentation device.

The set top box 110 accepts commands from the user in at least two ways. User commands can be provided to the set top box 110 via a set top box user input interface 206, which is communicatively coupled to the set top box processor 204 which implements execution of the user command.

User commands can also be provided to the set top box via the PDA 114. The PDA 114 comprises a user input interface 118, which accepts user commands and translates those commands into command signals (additionally, a user may input information on screen 116). These command signals are provided to the PDA processor 220, which generates coded signals according to the command signals from the user input interface 118. These coded signals are provided to a transmitter 210, which transmits the control signals to the set top box 110 via communications link 124. In one embodiment, the communications link 124 is provided in infrared (IR) frequencies using an IR light emitting diode (LED), however, communications link 124 may be a radio frequency (RF), visible light, ultraviolet (UV), or other link. The control signals are received by the set top box command receiver 208 and provided to the set top box processor 204 which implements the execution of the user command.

Figure 3:
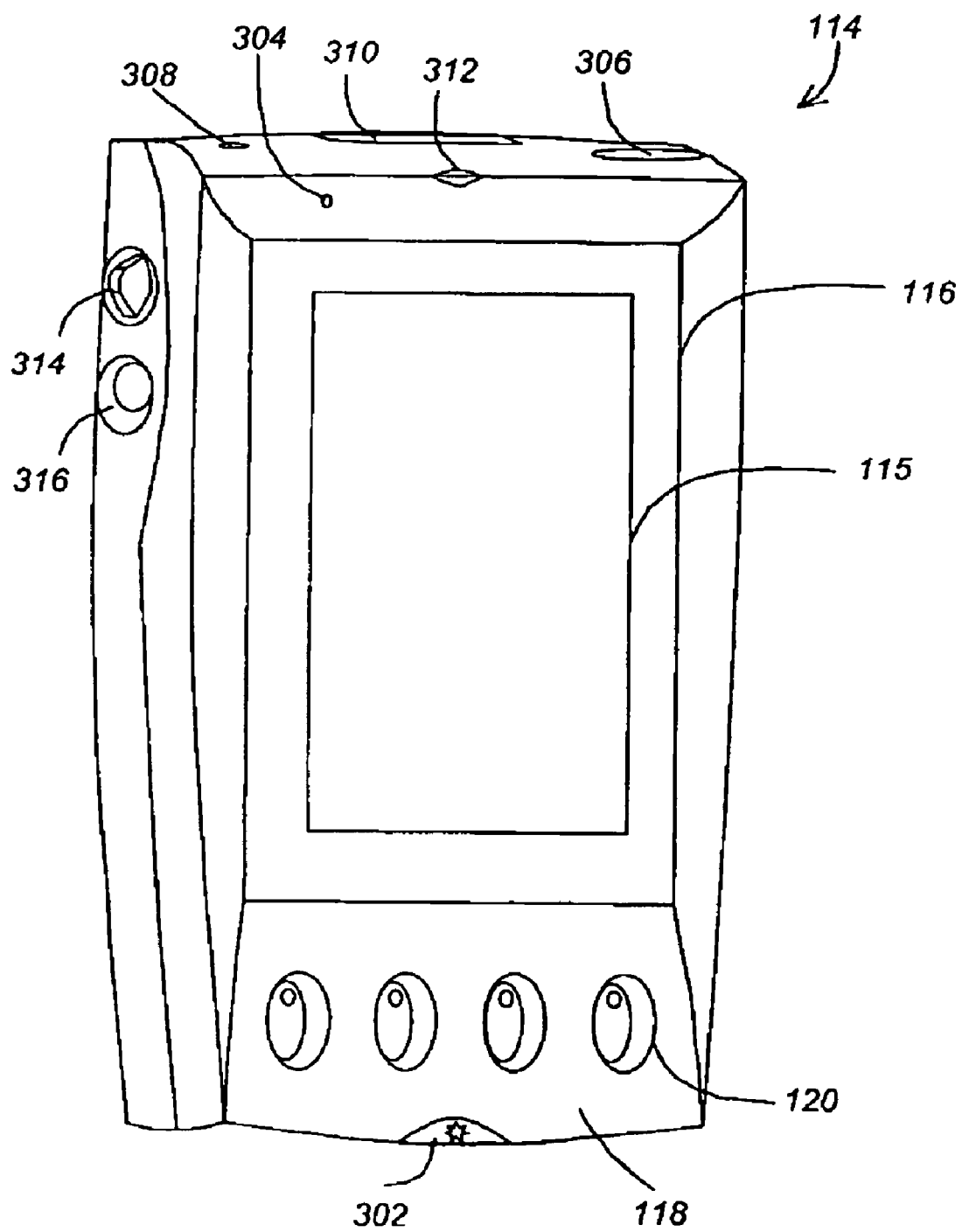
FIG. 3 is a hand held computing device used in accordance with one or more embodiments of the invention.

As illustrated in FIG. 3, the user input interface may be displayed on a display screen 118 of PDA 114. Alternatively, PDA 114 may be used in connection with a graphical user interface 115 that the user is familiar with and that is displayed on a display device (such as television 112). For example, the graphical user interface 115 may be formatted in the same manner and display similar options and button use as the user's current menu options available in DirecTV®.

In addition to or as an alternative to the above, the present invention may also comprise a second communication link 122B from the PDA 114 to the set top box 110. This communication link 122B is implemented by a second transmitter 216 communicatively coupled to the PDA processor 220 transmitting to a second set top box receiver 218 communicatively coupled to the set top box processor 204. This second communication link 122B can be used to augment the information provided by the first communication link 124. For example, if the first communications link 124 uses IR frequencies, the second communication link 122B can be used in situations where the first communication link 122A has been severed due to interference, excessive range, or interfering objects. The second communication link 122B can also be used to transmit data where higher bandwidth or higher security is desired.

If desired, the set top box processor 204 can further process the data for better presentation to the user. For example, undesirable audio/visual signals may be filtered to eliminate commercials. The data can be augmented with other useful information, such as text information concerning the program or actors, if desired before transmission to the PDA 114.

The set top box 110 also comprises a set top box transmitter 212, which is communicatively coupled to the set top box processor 204. The set top box transmitter 212 transmits a signal having information including the parameter or parameters described above to the PDA 114 via communications link 122A. In one embodiment, the communication link 122A is implemented such that the signal from the set top box 110 is received by the PDA 114 regardless of whether there are intervening walls or other obstacles between the PDA 114 and the set top box 110. This may be implemented by using RF transmission frequencies.

In one or more embodiments, the signal transmitted to the PDA 114 by the set top box 110 may be transmitted over a constant periodic interval (i.e. every 0.5 seconds). In an alternate embodiment, the signal transmitted to the PDA 114 by the set top box 110 may be transmitted whenever the PDA 114 requests the transmittal of information. In yet another embodiment, the signal may be transmitted by the set top box 110 only when the amount of information to be transferred to the PDA 114 exceeds a preset or selectable threshold. For example, data may be sent from the set top box 110 to the PDA 114 whenever the amount of information to be transmitted exceeds 500 KB.

The signal transmitted by the set top box transmitter 212 is received by the PDA receiver 214, decoded, and provided to the PDA processor 220. The PDA processor 220 may use the received signals to drive a communicatively coupled user output interface/display screen 116 to present the information in the processed received signals to the user. Additionally, the PDA processor 220 may use the received signals to output audio signals through a speaker in PDA 114 or through headphones connected to PDA 114. In one embodiment, the PDA processor 220 comprises a controller integrated circuit (IC) such as a micro control unit (MCU).

In one embodiment, the PDA 114 includes a memory communicatively coupled to the PDA processor 220. This memory may include, for example, a buffer for temporarily storing data received from the set top box 110, before the data is presented to the user on the user output interface/screen 116 or through a speaker. The memory may also include a read only memory (ROM) for storing processor instructions for communicating and routing of data, and/or a random access memory (RAM) for storing commands implementing other PDA 114 functions.

The user output interface 116 can take many forms as described above. In one embodiment of the present invention, the user output interface 116 comprises a 256 color, highly reflective, TFT, liquid crystal display. Alternatively or in combination with the above, the user output interface 116 may comprise a light emitting diode (LED) display. Further, embodiments of the invention are not limited to the above described display devices. In accordance with embodiments of the invention, any type of display device, now known or unknown, may be used.

The term "set top box" 110 as used herein, is intended to refer to any device capable of receiving program information signals, and need not be physically distinct from the presentation device. For example, the set top box 110 may be an integral portion of the television 112, or a video recording device such as a video cassette recorder (VCR) in communication with the television 112. Further, while the set top 110 box has been described as receiving broadcast television signals from a satellite 128, the scope of the present invention is not so limited. The set top box 110 and PDA 114 of the present invention can also be used to receive terrestrial signals such as UHF and VHF broadcast signals, and to align a conventional multi or single element antenna to maximize signal reception or to minimize multipath distortion. For that matter, the present invention can also be used with other program information sources, such as MMDS, LMDS, or audio program material broadcast by satellite or on amplitude modulation (AM) and frequency modulation (FM) frequency bands.

The foregoing can be used to transmit a wide variety of parameters to the user via the PDA 114. For example, in embodiments wherein the set top box is incorporated into a VCR, the communications link 122A can be used to indicate VCR functions, such as when a tape has completed rewinding, or to what channel the VCR is tuned. This link also permits the set top box 110 to initialize the PDA 114 with new or additional programming for the PDA processor 220, or to command the PDA to beep or otherwise announce itself so that it might be more easily located.

Details of PDA 114 in accordance with one or more embodiments of the invention are illustrated in FIG. 3. PDA 114 contains screen 116 user input interface 118, customizable program buttons 120, and infrared port 306. In addition, PDA 114 may contain an instant on/off and light button 302, a dial and action button 314, an instant exit button 316, a built-in microphone 304, an input/output audio jack 308, a shielded type CF expansion slot 310, and an indicator light 312. One or more embodiments of the invention may also include an instant voice recorder button, a stylus/light pen, and a speaker.

In accordance with one or more embodiments of the invention, PDA 114 maintains the ability to record and store any information in its memory that is transmitted from set top box system 110. Thus, the PDA 114 can call up from the archives of (or record in real time from) any set top box system 110. The information to be recorded by PDA 114 from set top box 110 may consist of any music CD, book, video film clip, audio/visual signal, and video game. Further, since the set top box 110 includes encryption/decryption technology, copyright infringement may be reduced. Once stored within the PDA 114, the user can take the PDA 114 anywhere and replay the music CD (using a built in speaker or stereo headphones plugged into input/output audio jack 308), read a book, play a video game, or view audio/visual signals such as film clips on screen 116. Further, PDA 114 is capable of transferring its captured components to any other set top box 110 or receiver and therefore play or show what is stored on PDA 114 on a full screen television or other device connected to set top box 110 at any location. In accordance with one or more such embodiments, data transport will be via the IR port 306 or can be facilitated via a docking station for PDA 114.

Using such a PDA 114, any user can essentially take any audio/visual signal or information transmitted from set top box 110 with him or her. Downloading several books, a CD (or a selection of music created from several CDs), and several video clips of news, sports events, etc. will allow the user to select and take a portable instantly modifiable multimedia library. For example, a user can modify a music CD in any hotel room or other location while on a vacation as long as that facility has a compatible set top box 110. Additionally, presenters who wish to provide visual files on screen can do so by capturing video clips and then displaying the clips during a presentation using a set top box 110 connected to a large screen television.

Thus, as described above, information (encrypted or non-encrypted) is broadcast via satellite 128, received by reflector/satellite dish 104, and transmitted to set top box 110 (where the information may be decrypted). PDA 114 interacts with set top box 110 to record any desirable information on the PDA 114. Such interaction can include recording audio/visual signals in real time such as during the broadcast of a television program. Additionally, the interaction can include retrieving information stored in an enhanced set top box 110 that has been configured with memory. Alternatively, in accordance with one or more embodiments of the invention, information is continually being broadcast through a channel at an extremely high rate. The set top box 110 and PDA 114 maintain the ability to identify which information is being transmitted at any given time. Consequently, out of all of the information broadcast, the desirable information can be filtered out and captured by the PDA 114.

The transmission of the information from set top box 110 to PDA 114 is through infrared port 306 or a physical connection between PDA 114 and set top box 110 such as a cable. Once received by PDA 114, the information may be output for viewing/listening by the user on screen 116, a built-in speaker, or headphones/speakers connected to audio input/output jack 308. Additionally, prior to viewing/listening to the information in PDA 114, PDA processor 220 may be utilized to install the information for use by the PDA 114 or software installed on PDA 114. For example, if a video game is downloaded to PDA 114 from set top box 110, the video game software may need to be installed on PDA 114 prior to use. Thus, in accordance with one or more embodiments of the invention, once the desired information is downloaded by PDA 114 from set top box 110, the information may be installed and played back directly on the PDA 114.

To play or listen to the downloaded information, one of the programmable buttons 120 may be utilized. Additionally, a graphical user interface (GUI) on display 116 (or a familiar GUI on output device 112) may display virtual buttons or mechanisms to operate and view the information. For example, a GUI multimedia player may provide for a stop button, pause, button, play button, fast forward button, skip button, etc. The GUI may also prompt the user to edit the information, erase the information, or perform a limitless amount of functions. In another example, the user may interact with the normal GUI displayed on television 112 that the user is familiar with and that is utilized for all other actions.

In accordance with one or more embodiments of the invention, once the information is stored on PDA 114, it may be transmitted back to any compatible set top box 110 using infrared port 306 for immediate display or listening on devices connected to set top box 110 such as television 112 or MP3 player. For example, a video clip stored on PDA 114 may be transmitted to a set top box 110 and immediately played back on television 112. The transmission and playback of the video clip may be controlled merely by pressing a single button 120 on PDA 114 (or by interacting with a familiar GUI as described above). Another example is that of playing back a CD, or a single track from a CD on a stereo or speakers that are connected to set top box 110.

In conjunction with controlling set top box 110, PDA 114 may also be configured as a remote control device to control the operations of a television, VCR, stereo system, etc. Thus, PDA 114 is a unique device that may be used to transport video/audio signals and other information for playback on any device connected to a compatible set top box 110.

In accordance with one or more embodiments of the invention, as described above, set top box 110 may be configured with memory to store the information transmitted from and to PDA 114. Additionally, set top box 110 may be configured for data streaming and encryption/decryption. Data streaming is a technique for transferring data such that it can be processed as a steady and continuous stream. With data streaming, set top box 110 can start displaying the data (e.g., the audio/visual signals or other information) before the entire file has been transmitted. For data streaming to work, set top box 110 must be able to collect the data and forward the data to processor 204 as a steady stream for conversion to sound or pictures for display on television 112 or other output device. Further, a buffer may be provided within set top box 110 to store excess data that is received more quickly than the data can be processed and output. Various streaming technologies are available and emerging. Any streaming technology may be used in accordance with one or more embodiments of the invention.

In accordance with one or more embodiments of the invention, the PDA 114 may be a combination of the Aero device and the Rio player as described above. Further, the audio/visual information may include but is not limited to a video clip, an audio clip, a picture, an electronic version of a book, and a video game. Additionally, in accordance with one or more embodiments of the invention, set top box 110 is an enhanced version of the set top box currently available from DIRECTV®.

Figure 4:
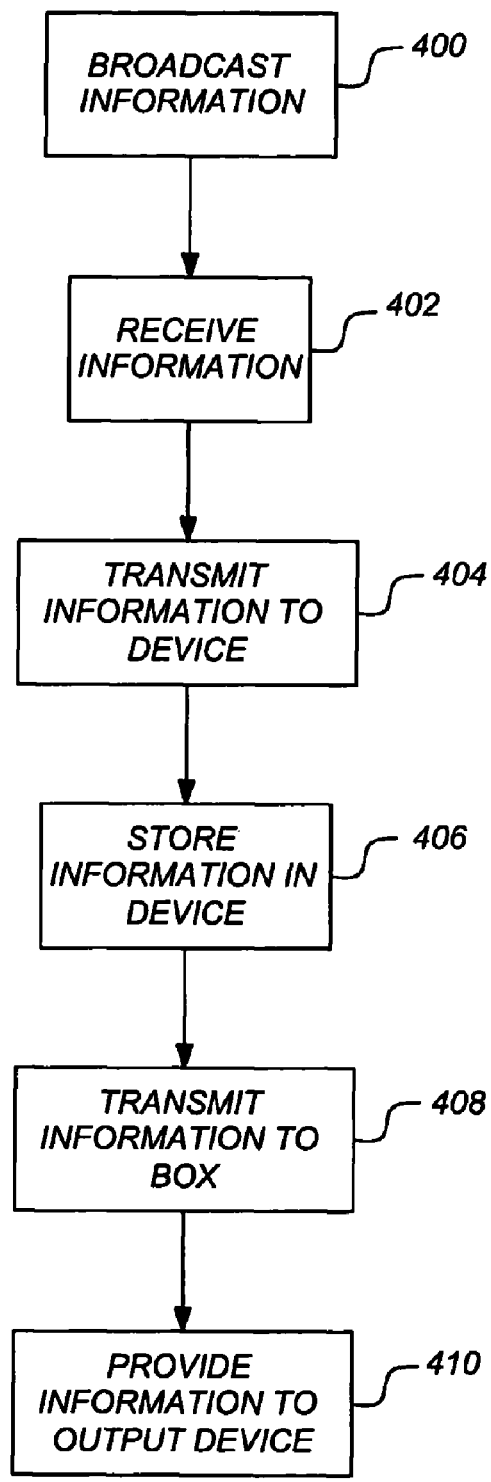
FIG. 4 is a flow chart showing the operations used to practice one or more embodiments of the invention.

FIG. 4 is a flow chart showing the operations used to practice one or more embodiments of the invention. At step 400, information such as audio/visual signals are broadcast from a satellite 128. At step 402, the information is received in a set top box 110. As described above, multiple steps may be required to transmit the information to the set top box (e.g., receiving the information in reflector/satellite dish 104, etc.). At step 404, the set top box transmits the information to a hand held computing device 114 (such as a PDA). In accordance with one or more embodiments of the invention, the transmission is accomplished through infrared radiation.

At step 406, the information is stored in the hand held computing device 114. At step 408, the information is transmitted from the hand held computing device 114 to a set top box 110. The transmission may be to a set top box 110 that is different from the original set top box that received the transmission from the satellite, or it may the same set top box. Further, the transmission may be activated by depressing a single button 120 on the hand held computing device 114. At step 410, the information is provided from the set top box 110 to an output device 110 such as a television 112. Subsequently, the output device utilizes the information. For example, a television 112 may display a video clip on a display screen and output the sound through speakers. As described above, the transmission to the output device from the hand held computing device 114 and the display or utilization of the information by the output device may be activated by the single depression of a button 120 on hand held computing device 114.

CONCLUSION

This concludes the description of the preferred embodiments of the present invention. In summary, the present invention describes a method, apparatus, and article of manufacture for digitally storing audio/visual signals and other information transmitted using infrared radiation on a hand held computing device and transmitting the information from the hand held computing device back to a set top box for playback and/or storage.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system of displaying audio/visual information on an output device using a set top box and a hand held computing device to store the audio/visual information and control the set top box, the system comprising:
   (a) two or more set top boxes (STBs) for controlling a display of audio/visual information, wherein each STB is configured to:
      (i) receive broadcast audio/visual information;
      (ii) transmit audio/visual information to a hand held computing device;
      (iii) receive audio/visual information from the hand held computing device;
      (iv) transform the audio/visual information received from the hand held computing device to a form suitable for presentation on an output device; and
      (v) cause the transformed audio/visual information to be displayed on the output device;
   (b) the hand held computing device configured to:
      (i) receive a user command from a user;
      (ii) translate the user command into a command signal;
      (iii) control one or more of the STBs using the command signal;
      (iv) receive audio/visual information from a first STB;
      (v) store the received audio/visual information;
      (vi) transmit the stored audio/visual information to a second STB for display on the output device.

2. The system of claim 1, wherein the first STB and second STB are the same.

3. The system of claim 1, wherein the first STB and second STB are different STBs.

4. The system of claim 1, wherein:
   (a) the user command comprises a depression of a single button on the hand held computing device; and (b) the user command causes:
  (i) the transmission of the audio/visual information from the hand held computing device to the second STB; and
  (ii) the second STB to playback the audio/visual information on the output device.

5. The system of claim 1, wherein the audio/visual information is stored on the hand held computing device in encrypted form.

6. The system of claim 1, wherein the hand held computing device communicates with one or more of the STBs via a wireless transmission.

7. The system of claim 1, wherein the hand held computing device communicates with one or more of the STBs via a wired connection.

8. The system of claim 1, wherein the hand held computing device is further configured to control a video cassette recorder that is incorporated into one or more of the STBs.

9. The system of claim 1, wherein the one or more of the STBs are configured to filter out desirable information from the broadcast audio/visual information for transmission and storage on the hand held computing device.

10. The system of claim 1, wherein the audio/visual information is transmitted from one of the STBs to the handheld computing device over a constant periodic interval.

11. The system of claim 1, wherein the audio/visual information is transmitted from one of the STBs to the handheld computing device only when an amount of the audio/visual information exceeds a threshold.

12. The system of claim 1, wherein the audio/visual information is transmitted from one of the STBs to the handheld computing device when requested by the hand held computing device.

13. A set top box (STB) used for displaying audio/visual information on an output device, wherein the STB is configured to:
  (a) control a display of audio/visual information on an output device;
  (b) receive broadcast audio/visual information;
  (c) transmit audio/visual information to a first of one or more hand held computing devices, wherein each of the one or more handheld computing devices is configured to:
    (i) receive a user command from a user;
    (ii) translate the user command into a command signal;
    (iii) control the STB using the command signal;
    (iv) receive audio/visual information from the STB;
    (v) store the received audio/visual information; and
    (vi) transmit the stored audio/visual information to the STB for display on the output device;
  (d) respond to the command signal;
  (e) receive audio/visual information from a second hand held computing device;
  (f) transform the audio/visual information received from the first or second hand held computing devices to a form suitable for presentation on an output device; and
  (g) cause the transformed audio/visual information to be displayed on the output device.

14. The STB of claim 13, wherein the first hand held computing device and second hand held computing device are different hand held computing devices.

15. The STB of claim 13, wherein:
  (a) the user command comprises a depression of a single button on the second hand held computing device; and
  (b) the user command causes:
    (i) the transmission of the audio/visual information from the second hand held computing device to the STB; and
    (ii) the STB to playback the audio/visual information on the output device.

16. The STB of claim 13, wherein the STB communicates with the one or more hand held computing devices via a wireless transmission.

17. The STB of claim 13, wherein the STB communicates with the one or more hand held computing devices via a wired connection.

18. The STB of claim 13, wherein:
  a video cassette recorder (VCR) is incorporated into the STB; and
  the VCR is controlled by the hand held computing device.

19. The STB of claim 13, wherein the STB is configured to filter out desirable information from the broadcast audio/visual information for transmission and storage on the hand held computing device.

20. The STB of claim 13, wherein the audio/visual information is transmitted from the STB to the first handheld computing device over a constant periodic interval.

21. The STB of claim 13, wherein the audio/visual information is transmitted from the STB to the first handheld computing device only when an amount of the audio/visual information exceeds a threshold.

22. The STB of claim 13, wherein the audio/visual information is transmitted from the STB to the first handheld computing device when requested by the first hand held computing device.

23. A handheld computing device used for displaying audio/visual information on an output device through a set top box, wherein the handheld computing device is configured to:
  (a) receive a user command from a user;
  (b) translate the user command into a command signal;
  (c) control two or more set top boxes (STBs) using the command signal, wherein each of the STBs is configured to:
    (i) receive broadcast audio/visual information;
    (ii) transmit audio/visual information to the hand held computing device;
    (iii) receive audio/visual information from the hand held computing device;
    (iv) transform the audio/visual information received from the hand held computing device to a form suitable for presentation on an output device; and
    (v) cause the transformed audio/visual information to be displayed on the output device;
  (d) receive audio/visual information from a first STB;
  (e) store the received audio/visual information;
  (f) transmit the stored audio/visual information to a second STB for display on the output device.

24. The handheld computing device of claim 23, wherein the first STB and second STB are the same.

25. The handheld computing device of claim 23, wherein the first STB and second STB are different STBs.

26. The handheld computing device of claim 23, wherein:
  (a) the user command comprises a depression of a single button on the hand held computing device; and
  (b) the user command causes:
    (i) the transmission of the audio/visual information from the hand held computing device to the second STB; and
    (ii) the second STB to playback the audio/visual information on the output device.

27. The handheld computing device of claim 23, wherein the audio/visual information is stored on the hand held computing device in encrypted form.

28. The handheld computing device of claim 23, wherein the hand held computing device communicates with one or more of the STBs via a wireless transmission.

29. The handheld computing device of claim 23, wherein the hand held computing device communicates with one or more of the STBs via a wired connection.

30. The handheld computing device of claim 23, wherein the hand held computing device is further configured to control a video cassette recorder that is incorporated into one or more of the STBs.

31. The handheld computing device of claim 23, wherein the one or more of the STBs are configured to filter out desirable information from the broadcast audio/visual information for transmission and storage on the hand held computing device.

32. The handheld computing device of claim 23, wherein the audio/visual information is received in the handheld computing device from one of the STBs over a constant periodic interval.

33. The handheld computing device of claim 23, wherein the audio/visual information is received in the handheld computing device from one of the STBs only when an amount of the audio/visual information exceeds a threshold.

34. The handheld computing device of claim 23, wherein the audio/visual information is received in the handheld computing device from one of the STBs when requested by the hand held computing device.

* * * * *